(12) United States Patent
Clark et al.

(10) Patent No.: US 8,352,960 B2
(45) Date of Patent: *Jan. 8, 2013

(54) LIMITING RECEIPT OF UNSOLICITED EVENTS BY A LOGICAL PARTITION IN A DATA STORAGE SYSTEM

(75) Inventors: Brian D. Clark, Tucson, AZ (US); Juan A. Coronado, Tucson, AZ (US); Beth A. Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1300 days.

This patent is subject to a terminal disclaimer.

(21) Appl. No.: 11/837,901

(22) Filed: Aug. 13, 2007

(65) Prior Publication Data

US 2009/0049457 A1 Feb. 19, 2009

(51) Int. Cl.
*G06F 9/44* (2006.01)

(52) U.S. Cl. .................... 719/318; 713/1; 713/2

(58) Field of Classification Search .......... None
See application file for complete search history.

(56) References Cited

U.S. PATENT DOCUMENTS

| | | | |
|---|---|---|---|
| 5,291,599 A | 3/1994 | Cohen et al. | |
| 5,345,590 A | 9/1994 | Ault et al. | |
| 5,386,512 A * | 1/1995 | Crisman et al. | 709/228 |
| 5,768,524 A * | 6/1998 | Schmidt | 709/224 |
| 6,834,296 B2 | 12/2004 | Brown et al. | |
| 6,920,587 B2 | 7/2005 | Dawkins et al. | |
| 2003/0056155 A1* | 3/2003 | Austen et al. | 714/45 |
| 2004/0215905 A1 | 10/2004 | Armstrong et al. | |
| 2004/0215916 A1 | 10/2004 | Bennett et al. | |
| 2006/0195644 A1 | 8/2006 | Arndt et al. | |
| 2006/0230209 A1 | 10/2006 | Gregg et al. | |

OTHER PUBLICATIONS

Clark, et al., "Limiting Receipt of Unsolicited Events by a Logical Partition in a Data Storage System;" U.S. Appl. No. 11/837,887, filed Aug. 13, 2007.

* cited by examiner

*Primary Examiner* — Lechi Truong
*Assistant Examiner* — Shih-Wei Kraft
(74) *Attorney, Agent, or Firm* — Dan Shifrin

(57) ABSTRACT

A logical partition (LPAR) is managed in a data processing system by performing an initial program load (IPL), commencing execution of an application on the LPAR and selecting from a plurality of unsolicited events of which the application is to receive notice. A command is transmitted to a storage controller indicating the identity of the selected unsolicited events, wherein the storage controller will store the information in a data structure. Upon the later occurrence of an unsolicited event, the storage controller will transmit to the LPAR only notices of the selected unsolicited events.

5 Claims, 3 Drawing Sheets

The present invention relates generally to data storage systems and, in particular, to increasing the efficiency with which storage controller resources are used.

BACKGROUND ART

A data storage system typically includes one or more storage controllers (also referred to herein as controllers) coupled one or more data storage devices, such as hard disk drives (HDDs). The controller receives read and write requests from one or more hosts, processes the requests and, in response reads the requested data from or writes (records) data to the storage device. Larger storage systems enable one physical host to be divided into one or more logical partitions (LPARs) which operate as separate computers. The LPARs may also run under different operating systems and may execute different application programs. During the initial program load (IPL) of the LPAR, logical paths are established between the host and the storage controller. Worldwide network node numbers (WWNN) are used to enable links between the communicating devices.

SUMMARY OF THE INVENTION

The present invention provides a storage controller having an interface through which the storage controller communicates with a host, a processor, and a memory for storing computer-readable code executable by the processor. The code includes instructions for performing an initial program load (IPL) on a logical partition (LPAR) in a data processing system and an application begins executing. The application selects from a plurality of unsolicited events those of which the application is to receive notice. A command is transmitted to a storage controller indicating the identity of the selected unsolicited events and the storage controller stores the information in a data structure. In one embodiment, the data structure is a bit map in which each bit represents one of the possible unsolicited events. Upon the later occurrence of an unsolicited event, the storage controller will transmit to the LPAR only notices of the selected unsolicited events.

DETAILED DESCRIPTION OF THE PREFERRED EMBODIMENT

During the normal operation of the storage controller, certain events, called unsolicited events, may occur. Unsolicited events include unsolicited status, such as a state change or an attention interrupt, and unsolicited sense, such as a redrive sense when a failover occurs or a service information message (SIM) sense when a hardware failure threshold is reached. When the storage controller generates an unsolicited sense, it uses internal resources, such as buffers, in which to store information related to the unsolicited sense. The buffers are subsequently freed up when the LPAR in the host sends a sense command to the storage controller to retrieve the unsolicited sense data. The application software being executed in the LPAR might handle the unsolicited status like unit check for sense data presentation properly, but may not take the steps necessary to close the unsolicited event, such as sending a sense command to the storage control unit to retrieve the sense data. The resources in the storage controller which were used to build the sense data would not be freed. Eventually, the storage controller may run out of resources if all of the buffers remain allocated, preventing new sense data from being built.

After an LPAR has undergone its IPL, a running application may only need to be aware of certain unsolicited events which occur in the storage controller or attached devices but not all of them. For example, the application may only need to be aware of state change interrupts of devices in a peer-to-peer remote copy (PPRC) relationship. However, the storage controller currently transmits information about all unsolicited events to the LPAR. And if, as noted above, the application fails to direct that the sense data in the storage controller be freed, resources in the storage controller may become limited and prevent further sense data from being generated.

Figure 1:
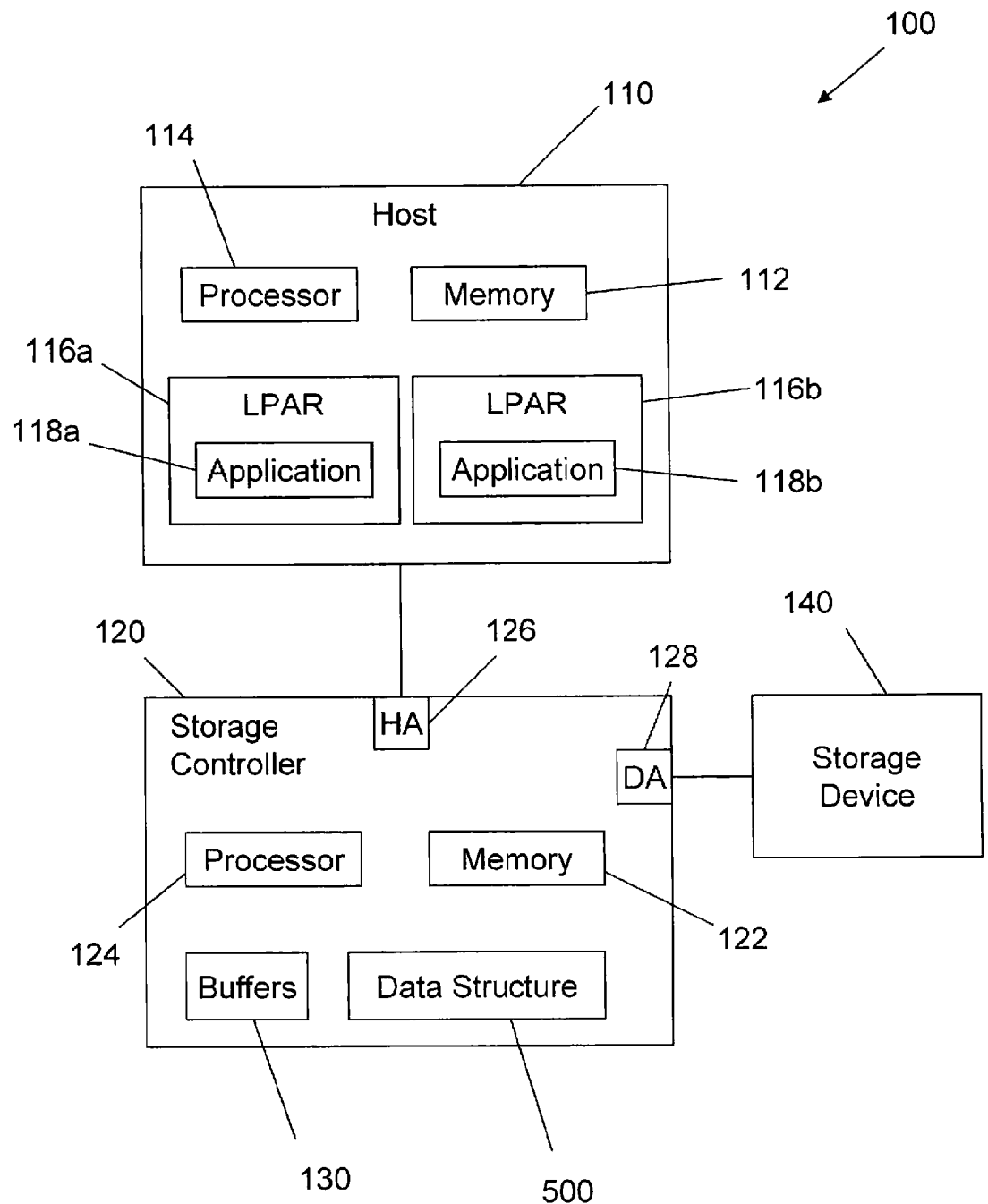
FIG. 1 is a block diagram of a data processing system in which the present invention may be implemented.

FIG. 1 is a block diagram of a data processing system 100 in which the present invention may be implemented. The system 100 includes one or more hosts, collectively represented by a host 110, one or more storage controllers, collectively represented by a storage controller 120, and one or more storage devices, collectively represented by the storage device 140. The storage device 140 may be any type of storage device, such as hard disk drives, or a combination of devices. The host 110 includes a memory 112 for storing computer-readable code containing program instructions and a processor 114 which executes the instructions stored in the memory 112. The host 110 can create multiple logical partitions (LPARs), two of which are illustrated in FIG. 1 as 116a and 116b. Each LPAR 116a, 116b is capable of running one or more applications 118a, 118b, respectively.

The storage controller 120 includes a memory 122 for storing computer-readable code containing program instructions and a processor 124 which executes the instructions stored in the memory 122. The storage controller also includes host adapters, represented by a host adapter 126, through which communications with the host 110 pass, and device adapters, represented by a device adapter 128, through which communications with the storage device 140 pass. The storage controller 120 further includes one or more buffers 130 for storing unsolicited events and a data structure 500 containing an indication of which unsolicited events an application, such as the application 118a, is to be made aware. The buffers 130 or data structure 500, or both, may be stored in the memory 122 or may be stored in other memory.

Figures 2, 4:
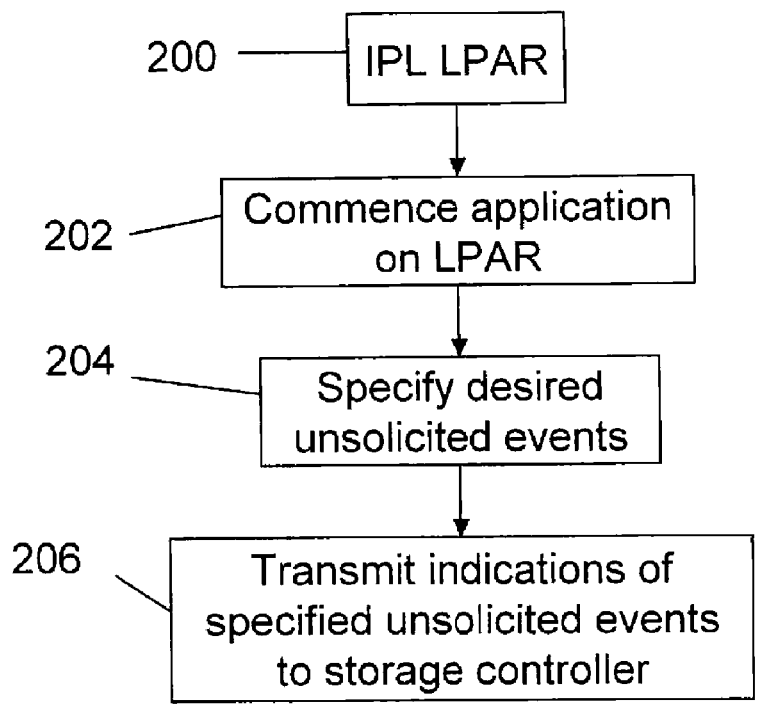
FIG. 2 is a flowchart of one aspect of a method of the present invention.
FIG. 4 illustrates an example of a data structure which may be used to hold sense event information.
Figure 3:
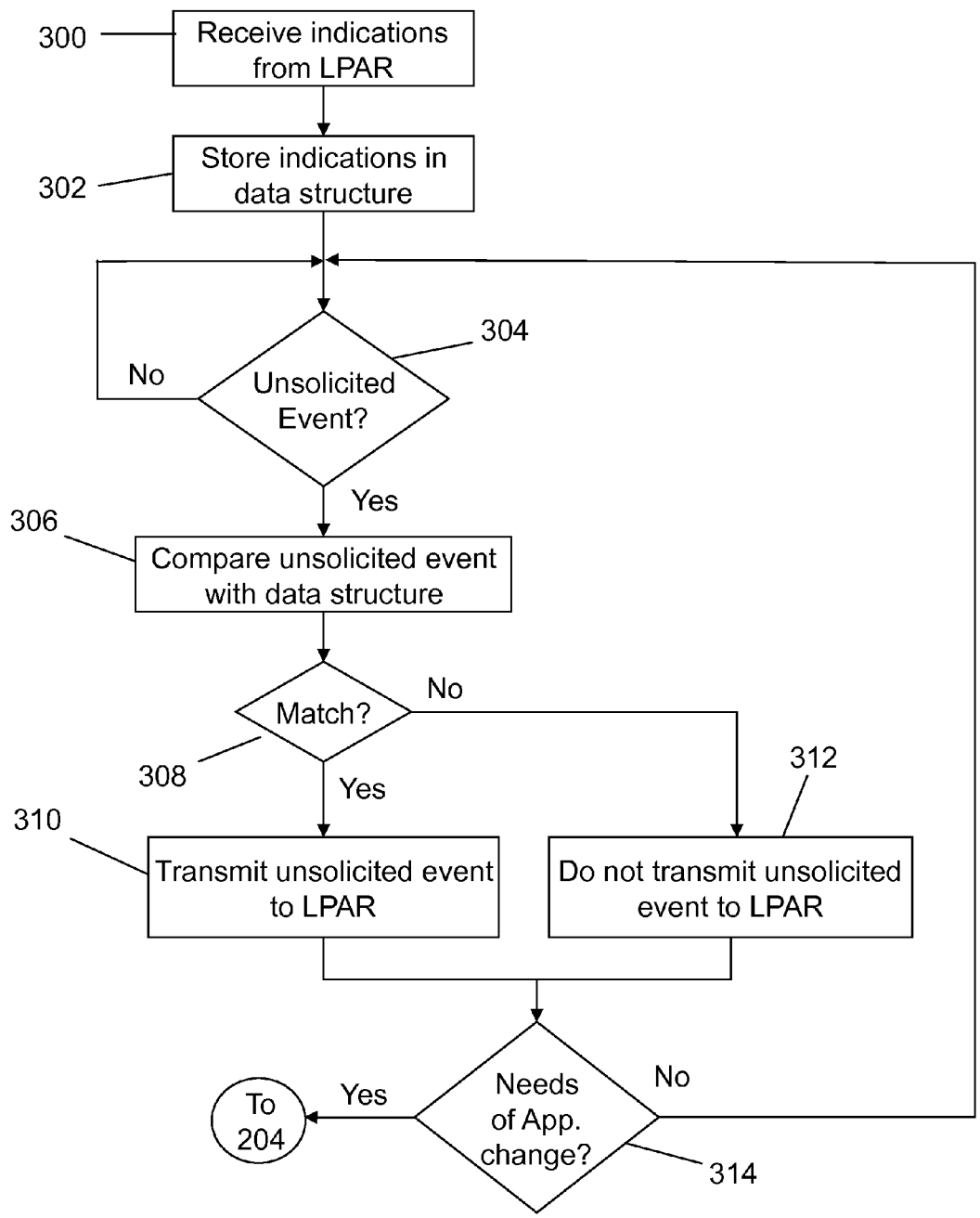
FIG. 3 is a flowchart of another aspect of a method of the present invention.

A method of the present invention will now be described with reference to the flowcharts of FIGS. 2 and 3. The method may be executed by the processors 114, 124 from program instructions stored in the memory devices 112, 122, may performed by hardware, such as ASICs in the host 110 and storage controller 120, or by any combination. An IPL is performed on the LPAR 116a (step 200) and the application 118a commences on the LPAR 116a (step 202). The application 118a then specifies the unsolicited events of which it is to be notified (step 204). Unsolicited events from which the application 118a may select may include, but are not limited to, PPRC-related state change interrupts, device state change interrupts, attention interrupts, multipath lock facility attention interrupts, service information message sense, PPRC-related sense, warmstart-related sense, failover-related sense and failback-related state changes. The application 118a may select any, all or none of the possible unsolicited events, depending on the needs of the application 118a. After the unsolicited events are selected, the LPAR 116a transmits a command to the storage controller 120 containing an indication of which unsolicited events have been selected (step 206).

The storage controller 120 receives the command (step 300, FIG. 3) and stores the information in the data structure 400 (step 302). The data structure 400 may be a bit map, as illustrated in FIG. 4, in which each bit represents one of the possible unsolicited events. A bit in a first state, such as logical 1, indicates that the unsolicited event represented by the bit is among those selected by the application 118a. Conversely, a bit in a second state, such as logical 0, indicates that the unsolicited event represented by the bit is not among those selected by the application 118a. It will be appreciated that a logical 0 may be used to indicate that an unsolicited event is one which has been selected by the application 118a. Instead of specifying individual unsolicited events, the command may include suborders which indicate which of several categories of unsolicited status events are to be allowed or to be disallowed. Categories may include (but are not limited to), for example, all unsolicited events related to PPRC, multi-path lock facility (MPLF), sense changes related to device status, and state changes related to device status. It will also be appreciated that other types of data structures, such as a lookup table, parameter flags or any other structure to indicate the identity of which unsolicited events are allowed or disallowed, may be used instead of the bitmap. Moreover, the data structure may have a default state to be used if the LPAR does not transmit a selection command. The default state may indicate that all of the possible unsolicited events or categories have been selected; alternatively, the default state may indicate that none of the possible unsolicited events or categories have been selected. It will be appreciated that the default state may indicate any other combination of selected and unselected unsolicited events and categories.

Upon the occurrence of an unsolicited event in the storage controller 120 (step 304), a determination is made as to whether the unsolicited event (or the group of which the unsolicited event is a member) is one which is indicated in the data structure 400 as having been selected by the application 118a (step 306). If so (step 308), information about the unsolicited event is transmitted to the LPAR 116a (step 310); otherwise, the information prevented from being transmitted (step 312). In this manner, the application 118a only receives information about those specific unsolicited events which it has requested and resources are not wasted on other unsolicited events.

Additionally, if, while the application 118a is running on the LPAR 116a, the needs of the application 118a change (step 314), the LPAR 116a may send a new command to the storage controller 120 with an updated request to reselect unsolicited events. The data structure will then be updated and the modification can take immediate effect without performing a new IPL. Thus, individual LPAR applications are able to fine tune event presentations.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for managing a logical partition.

What is claimed is:

1. A storage controller, comprising: a first interface through which the storage controller communicates with a host;
   a processor; and
   a memory for storing computer-readable code executable by the processor, the code comprising instructions for:
      receiving information from a logical partition (LPAR) on the host indicating the identity of unsolicited events selected by an application of which the application is to receive notice;
      a bit map storing the received information, the bit map comprising a plurality of bits, each bit representing an unsolicited event and having a first state indicating that the represented unsolicited event is selected and a second state indicating that the represented unsolicited event is unselected; each bit of the bit map represents one category of unsolicited events; each bit of the bit map has a first state which indicates that the represented category is selected and a second state which indicates that the represented category is unselected;
      upon an occurrence of an unsolicited event, determining whether the unsolicited event is a selected unsolicited event;
      if the unsolicited event is a selected unsolicited event, transmitting to the LPAR a notice of the unsolicited event;
      if the unsolicited event is not a selected unsolicited event, refraining from transmitting to the LPAR a notice of the unsolicited event;
      upon an occurrence of an unsolicited event, determining whether the unsolicited event is in a selected category;
      if the unsolicited event is in a selected category, transmitting to the LPAR a notice of the unsolicited event;
      if the unsolicited event is not in a selected category, refraining from transmitting to the LPAR a notice of the unsolicited event; and
      wherein the bit map has a default state.

2. The storage controller of claim 1, wherein the default state of the bit map indicates that all unsolicited events are selected.

3. A computer program product of a non-transitory computer readable medium usable with a programmable computer, the computer program product having computer-readable code embodied therein for managing a logical partition (LPAR) in a data processing system, the computer-readable code comprising instructions for:
      performing an initial program load (IPL) for an LPAR;

commencing execution of an application on the LPAR;

transmitting a bit map to a storage controller indicating the identity of the unsolicited events selected by the application of which the application is to receive notice, the bit map comprising a plurality of bits, each bit representing an unsolicited event and having a first state indicating that the represented unsolicited event is selected and a second state indicating that the represented unsolicited event is unselected, each bit of the bit map represents one category of unsolicited events, each bit of the bit map has a first state which indicates that the represented category is selected and a second state which indicates that the represented category is unselected, wherein the storage controller will store the bit map and transmit to the LPAR notices of only the selected unsolicited events, wherein upon an occurrence of an unsolicited event, determining whether the unsolicited event is in a selected category;

if the unsolicited event is in a selected category, transmitting to the LPAR a notice of the unsolicited event;

if the unsolicited event is not in a selected category, refraining from transmitting to the LPAR a notice of the unsolicited event; and wherein the bit map has a default state.

4. The computer program product of claim 3, wherein the default state of the bit map indicates that all unsolicited events are selected.

5. The computer program product of claim 3, further comprising instructions for, during the execution of the application, reselecting from the plurality of unsolicited events without performing an new IPL of the LPAR.

\* \* \* \* \*